United States Patent [19]

Sherman

[11] Patent Number: 5,493,892
[45] Date of Patent: Feb. 27, 1996

[54] METHOD FOR CALIBRATING THE TIME RESPONSE OF A MASS AIR FLOW SENSOR BY LASER TRIMMING SELECTED RESISTORS AND WITHOUT AN AIR FLOW

[75] Inventor: James M. Sherman, Farmington Hills, Mich.

[73] Assignee: Ford Motor Company, Dearborn, Mich.

[21] Appl. No.: 348,702

[22] Filed: Dec. 2, 1994

Related U.S. Application Data

[63] Continuation-in-part of Ser. No. 41,368, Apr. 1, 1993, abandoned.

[51] Int. Cl.$^6$ ............................. G01F 1/00; G01F 25/00; H01C 17/06
[52] U.S. Cl. ........................................... 73/3; 29/620
[58] Field of Search ........................ 73/3; 29/620, 610.1

[56] References Cited

U.S. PATENT DOCUMENTS

| | | | |
|---|---|---|---|
| 4,474,058 | 10/1984 | Drews et al. | 73/118.2 |
| 4,624,138 | 11/1986 | Ono et al. | 73/204 |
| 4,669,052 | 5/1987 | Bianco | 364/571 |
| 5,307,667 | 5/1994 | Caron | 73/3 |
| 5,311,762 | 5/1994 | Drexel | 73/3 |
| 5,390,528 | 2/1995 | Zurek et al. | 73/3 |

FOREIGN PATENT DOCUMENTS 0204183  12/1986  European Pat. Off. .

Primary Examiner—Richard Chilcot
Assistant Examiner—Joseph L. Felber
Attorney, Agent, or Firm—Peter Abolins; Roger L. May

[57] ABSTRACT

A method for calibrating the response time of a mass air flow sensor in which the sensors bridge offset voltage is measured and the constant $C_I$ is calculated from the initial value of the bridge offset voltage. $C_I$ is a constant of the heated resistor's resistance in the equation $RH=C+(1/I_H) C_I$. The response time of the mass air flow sensor is a function of $C_I$. A bridge offset voltage required to give $C_I$ a desired value is calculated. A pair of biasing resistors are trimmed while monitoring the value of the bridge offset voltage until the monitored value of the bridge offset voltage is equal to the desired value.

12 Claims, 2 Drawing Sheets

METHOD FOR CALIBRATING THE TIME RESPONSE OF A MASS AIR FLOW SENSOR BY LASER TRIMMING SELECTED RESISTORS AND WITHOUT AN AIR FLOW

CROSS-REFERENCE TO RELATED APPLICATION

This application is a continuation-in-part of abandoned patent application Ser. No. 041,368, filed on Apr. 1, 1993.

TECHNICAL FIELD

The invention is related to the field of mass air flow sensors and, in particular, to a method for calibrating the response time of a mass air flow sensor.

BACKGROUND ART

The calibration of the time response of a mass air flow sensor has, in the past, been a time-consuming operation, not well suited for mass production. In the production time response calibration procedure currently being used, the mass air flow sensor is mounted on a test fixture having the capabilities to rapidly change the air flow being sensed by the mass air flow sensor between two different precisely controlled air flow rates, and the response time is measured. Resistor elements controlling the response time are then laser-trimmed to adjust the response time of the mass air flow sensor to be within specified limits. The procedure is then repeated at least once to assure that the response time of the mass air flow sensor is within the specified limits.

The present invention is a method for calibrating the response time of a mass air flow sensor which does not require the mass air flow sensor to be subject to an air flow.

DISCLOSURE OF THE INVENTION

The invention is a method for calibrating the response time of a mass air flow sensor of the type having a heated resistor sensor element, a cold resistor and a balanced bridge control circuit. The balanced bridge control circuit has an operational amplifier having a positive input, a negative input and an output providing electrical power to the heated and cold resistors. The control circuit further has a first biasing resistor connecting the positive input of the operational amplifier to a reference voltage and a second biasing resistor connecting the negative input to the operational amplifier to the reference voltage. The values of the first and the second biasing resistors affect a bridge offset voltage generated by the current flowing through the heated and cold resistors.

The method consists of applying electrical power to the mass air flow sensor and measuring the bridge offset voltage. Then using a programmed microprocessor, an initial value of a constant $C_I$ of the heated resistor's resistance value is computed where the resistance value of the heated resistor RH in the control bridge is given by the equation:

$$RH = C + \frac{C_I}{I_H}$$

where

C is a constant approximately equal to the heated resistance of the heated resistor;

$C_I$ is a small constant controlling the response time of the mass air flow sensor; and $I_H$ is the current through the heated resistance.

The method then calculates a required value for the bridge offset voltage using a desired value for the constant $C_I$ which would produce a time response within specified limits. The desired value for the bridge offset voltage is then compared with the value of the initial bridge offset voltage and the first biasing resistor is laser-trimmed to reduce the value of the bridge offset voltage to the desired value in response to the initial value being greater than the desired value or laser-trimming the second biasing resistor to increase the value of the bridge offset value to the desired value when the initial value is less than the desired value.

The advantage of the disclosed response time calibration of the mass air flow sensor is that no air flow or step change in an air flow is required.

Another advantage is that the method permits the air flow sensor to be calibrated in only a fraction of the time required by the prior art.

These and other advantages of the disclosed method for calibrating the response time of a mass air flow sensor will become more apparent from a reading of the specification in conjunction with the drawings.

BEST MODE FOR CARRYING OUT THE INVENTION

Figure 1:
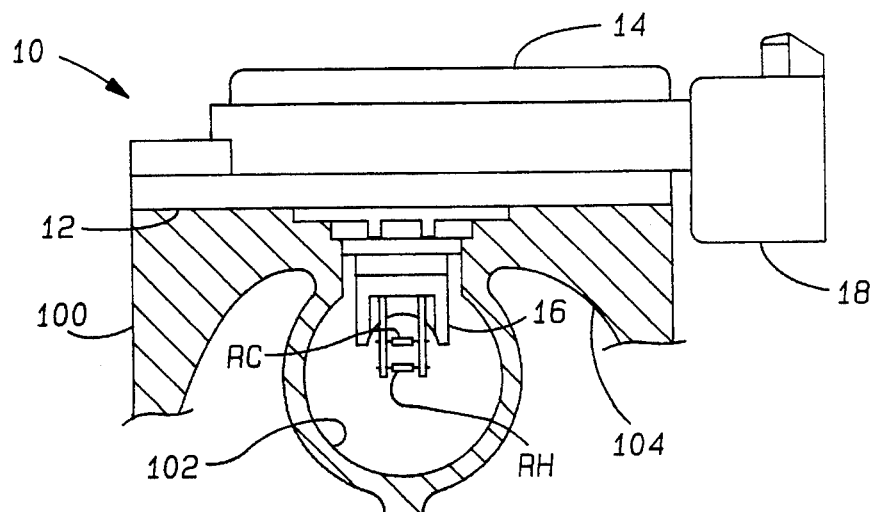
FIG. 1 is a frontal view of a mass air flow sensor.

A heated wire mass air flow sensor 10 is shown in FIG. 1. The mass air flow sensor has base 12 mountable on a sensor mounting member 100 of an air intake system of an internal combustion engine, an electronic housing 14, a sensor head 16 and an electrical connector 18. The sensor head 16 extends into a sensor air passageway 102 of the sensor mounting member 100 and senses the mass air flow therethrough.

Figure 2:
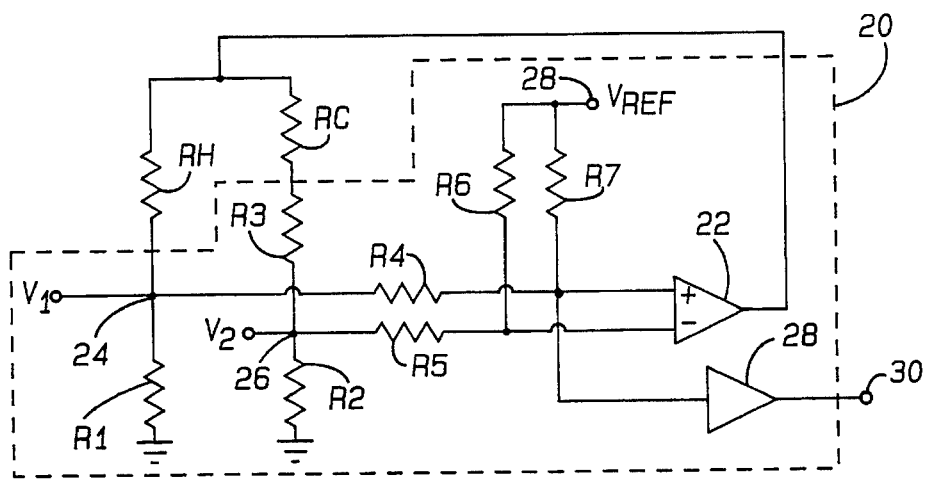
FIG. 2 is a circuit diagram of the balanced bridge circuit.

The primary air flow rate to the engine is through a much larger air flow passage 104. The sensor head 16 has a heated resistor RH and a cold resistor RC which are exposed to the air flow in the air intake system. The electronic housing 14 houses the electron circuit 20 contained within the dashed box shown in FIG. 2. The electrical connector 18 receives electrical power from an external source and transmits the output signal generated by the mass air sensor 10 to the engine's electronic fuel control system which computes the quantity of fuel to be delivered to the engine as a function of the sensed mass air flow rate.

The electronic circuit 20 is a balanced bridge circuit having the heated resistor RH in one branch of the balanced bridge and the cold resistor RC in the other branch. The heated resistor RH and cold resistor RC receive electrical power from the output of an operational amplifier 22. The heated resistor RH is connected to ground through a resistor R1 while the cold resistor RC is connected to ground through resistors R2 and R3.

In the preferred embodiment, the heated resistor RH has a cold resistance value of approximately 20 ohms and the cold resistor RC has a cold resistance value of 450 ohms. The resistance values of resistors R1, R2 and R3 are 10 ohms, 200 ohms and 230 ohms, respectively. The junction 24 between the heated resistor RH and resistor R1 is connected to the positive input to the operational amplifier 22 through, a resistor R4 while the junction 26 between resistors R2 and R3 is connected to the negative input of operational amplifier 22 through a resistor R5. The positive input of the operational amplifier 22 is also connected to a reference voltage $V_{REF}$ received at an input terminal designated $V_{REF}$ through a resistor R7. This reference voltage $V_{REF}$ is also connected to the negative input of the operational amplifier 22 through a resistor R6. The positive input to operational amplifier is also connected to amplifier 28 which outputs a mass air flow signal at terminal 30.

In operation of the circuit, resistors RC, R2 and R3 are used to set-up an overheat-ratio for resistors RH and R1. The current flowing through resistors RC, R2 and R3 produces a voltage at junction 26 applied to the negative input to operational amplifier 22. With no power applied to the circuit, the ratio of the values of resistors RC+R3 to R2 is approximately 3.4:1 while the ratio of the values of resistance RH to R1 is 2:1. Effectively, under initial power-up conditions, the voltage at junction 26 is approximately 23 percent of the output voltage $V_o$ of operational amplifier 22 and the voltage at junction 24 is approximately 30 percent of the output voltage $V_o$. This voltage differential between the positive and negative inputs to operational amplifier 22 will result in an increase in its output voltage $V_o$. As this voltage increases, the electric power dissipated by resistors RH and RC increases causing their temperatures to rise.

Since both RH and RC have positive temperature coefficients of resistance, their respective resistances will increase with their increase in temperature. Because of the lower resistance of RH, its temperature will increase at a faster rate than the temperature of RC until the voltage at junction 24 applied to the positive input of operational amplifier 22 is offset a predetermined value from the voltage at junction 26. This value is modified by the effects of the regulated voltage $V_{REF}$ received through resistors R6 and R7 which are also connected to the respective inputs of operational amplifier 22.

In the case of no air flow and where the values of the resistors RH, RC, R1, R2 and R3 are as previously given, the temperature of the resistor RH is approximately equal to the ambient temperature plus 200° C. while the temperature of resistor RC is approximately equal to the ambient temperature plus 6° C.

An air flow in the air intake system of an engine will cool resistor RH because of its higher temperature, more than resistor RC. Therefore, the offset voltage $V_{os}$ between the positive and negative inputs of operational amplifier 22 and its output voltage $V_o$ will increase until the bridge circuit again becomes balanced.

The resistors R4, R5, R6 and R7 are used to adjust the response time of the mass air flow sensors.

The invention is derived from an empirical examination of how the circuit controls the value of the heated resistor RH including the offset voltage $V_{os}$ applied between the positive and negative inputs to the operational amplifier 22. The following equation can be used to determine the resistance value of the heated resistor RH in the balanced bridge circuit 20:

$$RH = C + C_I \left( \frac{1}{I_H} \right) \qquad (1)$$

where

C is the approximated heated resistance value of resistor RH controlled by the circuit;

$C_I$ is a small constant controlling the response time of the mass air flow sensor based on the circuit components and the offset voltage $V_{os}$; and $I_H$ is the current through the heated resistance RH.

The constant C may be determined from the equation:

$$C = \frac{(RC+R3)}{R5} \ C_2 \left[ \frac{R1}{(C_1+1)} \left( \frac{R7(R5+R6)}{R6(R4+R7)} - \frac{R5}{C_2(RC+R3)} \right) \right] \qquad (2)$$

where $$C_1 = \frac{R1}{R4+R7} \text{ and} \qquad (3)$$

$$C_2 = \frac{R5}{R2} + \frac{R5}{RC+R3} + \frac{R5}{R5+R6}$$

The constant $C_I$ may be determined from the equation:

$$C_I = \frac{(RC+R3)}{R5} \ C_2 \left[ \frac{R5+R7}{R7} \left( V_{REF} \left( \frac{R4}{R4+R6} - \frac{R5}{R5+R7} \right) - V_{os} \right) + \frac{V_{REF}}{C_1+1} \ C_1 \left( \frac{R6(R5+R7)}{R7(R4+R6)} - \frac{R5}{C_2(RC+R3)} \right) - \frac{V_{REF}R5}{C_2(R5+R7)} \right] \qquad (4)$$

Figure 3:
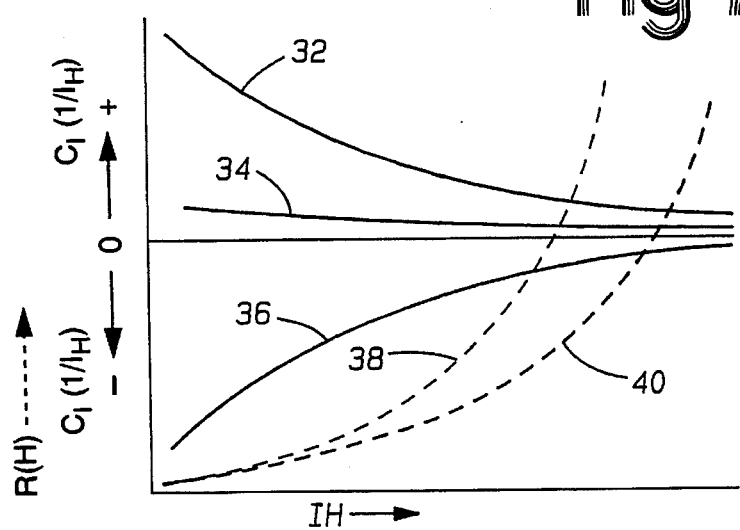
FIG. 3 is a graph showing the resistance of the heated resistor in the balanced bridge circuit and from a thermodynamic point of view as a function of heater current.

FIG. 3 is a graph showing the variation of the resistive values of the heated resistor RH as a function of the current $I_H$ in accordance with equation (1).

Curve 32 represents the value of the resistance of the heated resistor RH as a function of the current $I_H$ when $C_I$ has a significant value, for example $C_I \approx 0.10$. Curve 34 represents the resistance value of the heated resistor RH as a function of the current $I_H$ when $C_I$ has a value approaching 0 and curve 36 represents the resistive value of heater resistor RH when $C_I$ has a negative value.

The curve 38 shown in FIG. 3 represents the resistance value $RH_{TH}$ of heated resistor RH from a thermodynamic viewpoint for a first mass air flow rate. The resistance value $RH_{TH}$ may be derived from the equation:

$$RH_{TH} \frac{R_A}{1 - R_n \alpha_A (I_H^2/H)} \qquad (5)$$

where $\alpha_A$ the temperature coefficient of resistance of resistor RH, $I_H$ is the current through resistor RH, H is an overall heat transfer coefficient, and $R_A$ is the resistance value of resistor RH at an ambient temperature.

Curve 40 represents the resistance value $RH_{TH}$ of heated resistor RH for a mass air flow rate greater than the mass air flow rate of curve 38. The intersection of curves 38 or 40 with curves 32 or 34 indicates the value of RH and the current $I_H$ at which the mass air flow sensor 10 will operate for a given mass air flow rate. At this point, the resistance values derived from equations (1) and (5) are equal.

Figure 4:
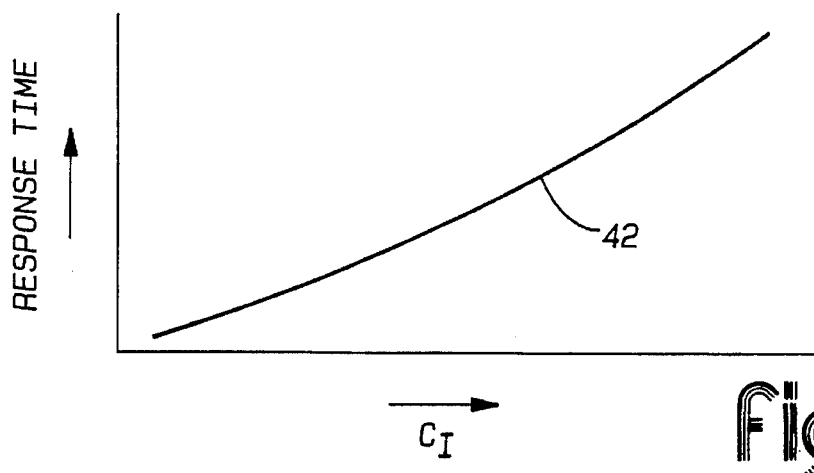
FIG. 4 is a graph showing the value of the constant $C_I$ as a function of the bridge offset voltage.
Figure 5:
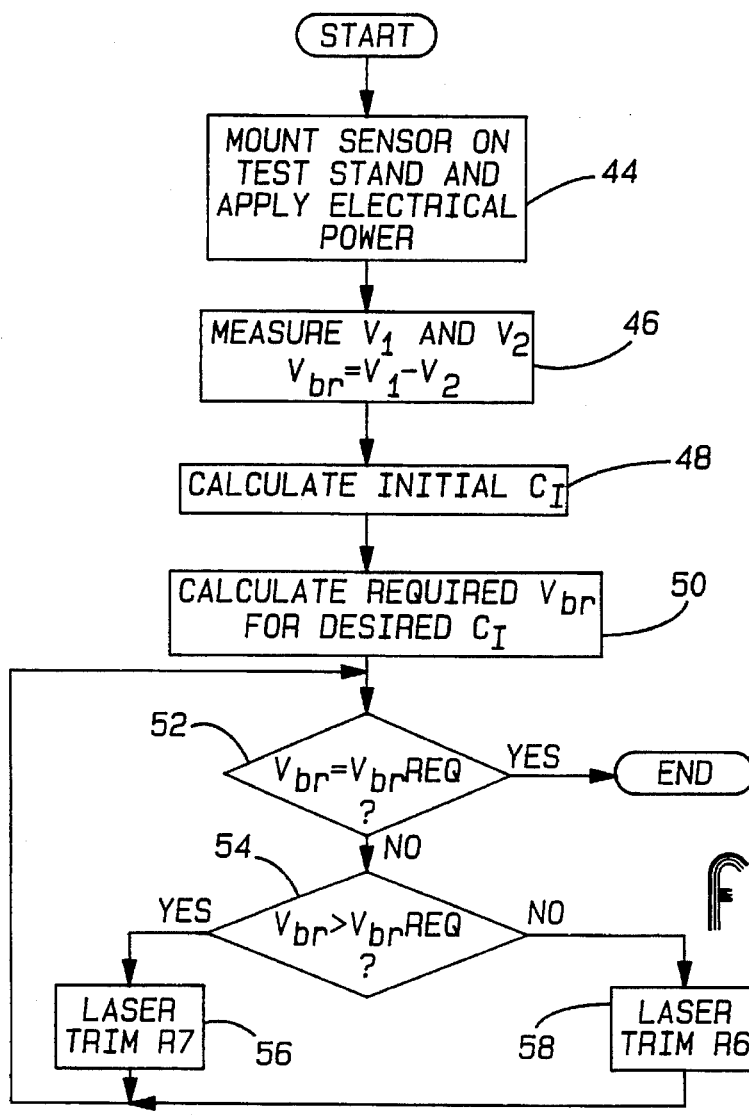
FIG. 5 is a flow diagram of the calibration process.

The relationship between response time and the constant $C_I$ are illustrated by curve 42 shown in FIG. 4. The greater the value of $C_I$, the longer the response time. The smaller the value of $C_f$, the shorter the response time and a negative value of $C_f$ will cause the balanced bridge circuit to oscillate. To calibrate the response time of the mass air flow sensor 10 to be within a specified range, $C_f$ has to be adjusted to have a preselected low positive value.

The value of $C_f$ can be adjusted by laser trimming resistor R6 or R7. For calibrating the response time to be within the specified limits without an air flow, it is necessary to determine the current value of $C_f$. The current value of $C_f$ can be determined by its relationship to the bridges offset voltage $V_{br}$ which is the difference in the voltage between the voltage $V_1$ measured at junction 24 and voltage $V_2$ measured at junction 26. All of the resistor values, which influence the value of $C_f$ are known at the beginning of the calibration and the value of the offset voltage $V_{os}$ between the inputs to the operational amplifier 22 may be determined by the initial value of the voltages $V_1$ and $V_2$ where:

$$V_{os} = V_{REF}\left(\frac{R4}{R4+R6} - \frac{R5}{R5+R7}\right) + \qquad (6)$$

$$V_1\left(\frac{R6}{R4+R6}\right) - V_2\left(\frac{R7}{R5+R7}\right)$$

Due to the relationship between $C_f$ and $V_{os}$ given in equation (4) and the linear relationship of $V_{br}$ to $V_{os}$ given in equation (7) given below, the initial value of $C_f$ can be determined using equation (4). Substituting a desired value for $C_f$ and the calculated value for the offset voltage $V_{os}$ into equation (4), a new value for resistor R6 or resistor R7 may be calculated. Once the new value for resistor R6 or R7 is determined the required bridge offset voltage $V_{br}$ may be calculated from equation (6) which may be rewritten as indicated as follows:

$$V_{br} = \left(\frac{R7+R5}{R7}\right)\left[V_{os} - V_{REF}\left(\frac{R4}{R4+R6} - \frac{R5}{R5+R7}\right) - \qquad (7)\right.$$

$$\left. V_1\left(\frac{R6}{R4+R6} - \frac{R7}{R5+R7}\right)\right]$$

The value of the required bridge offset voltage $V_{br}$ may be calculated using the initial measured value of the voltage $V_1$. It is recognized that during adjustment to the bridge offset voltage to the desired value of the bridge offset voltage $V_{br}$, the value of the voltage $V_1$ will change. The change in the bridge offset voltage $\Delta V_{br}$ during the adjustment of the response time is equal to the difference between the desired bridge offset voltage $V_{br}$ and the initial measured value of the bridge voltage $V_{br}$. Typically, in the circuit shown in FIG. 2, the values of the resistors are such that the maximum required adjustment to the bridge offset voltage $\Delta V_{br}$ is in the range of from −2.0 mV to +2.0 mV depending on whether R6 or R7 are adjusted. The maximum change $\Delta V_1$, in the value of the voltage $V_1$ during adjusting of the bridge offset voltage $V_{br}$ is approximately equal to ½ $\Delta V_{br}$. Therefore, the maximum change $\Delta V_1$ in the value of the voltage $V_1$ is 2.0 mV. In a practical application of the circuit shown in FIG. 2, the voltage $V_1$ measured at junction 24 (test point $V_1$) is in the range from 800 mV to 900 mV.

Taking $\Delta V_1$ to have a maximum value of 2 mV during the adjustment of the bridge offset voltage, it can readily be determined that the use of the initially measured value of the voltage $V_1$ in the solution of equation (7) will introduce an error of less than 1.0% in the calculated value of the desired bridge offset voltage. Therefore, the initial measured value of the voltage $V_1$ may be used in equation (7) to calculate the value of the required bridge offset voltage without introducing any significant error into the calculated value.

After calculating the value of the desired bridge offset voltage, the value is compared with the initial value of the offset voltage to determine whether resistance R6 or R7 should be laser trimmed. No trimming is required when the value of the desired offset voltage $V_{br}$ is the same as the value of the initially measured bridge offset voltage.

Knowing the value of the desired offset bridge voltage, the response time of the mass air flow sensor can be calibrated to be within the desired range by monitoring the initial value of the bridge offset voltage $V_{br}$ and laser trimming either R6 or R7 to adjust the value of the desired bridge offset voltage $V_{br}$ to have the value calculated to produce the desired value for $C_f$. In particular, laser trimming R6 will increase its resistance value and will increase the bridge offset voltage $V_{br}$ while laser trimming R7 will increase its resistance and will decrease the bridge offset voltage $V_{br}$. Therefore, either R6 or R7 may be laser trimmed while the bridge offset voltage $V_{br}$ is being monitored. This process results in $C_f$ having the selected or desired low positive value. As previously indicated, when $C_f$ has the selected positive value, the response time will be within the specified range.

The process for calibrating the response time of the mass air flow sensor will be discussed relative to the flow diagram shown in FIG. 4. The method begins by mounting the mass air flow sensor 10 on a test stand and applying electrical power as indicated by block 44.

The value of the initial bridge voltage $V_{br}$ is determined by measuring the values of $V_1$ and $V_2$ as indicated in block 46. The initial bridge voltage is the difference between the voltage $V_2$ measured at junction 26 and the voltage $V_1$ measured at junction 24. Test points $V_1$ and $V_2$ are provided on the mass air flow sensor circuit 20 to facilitate these measurements. After the actual value of the bridge offset voltage $V_{br}$ is determined, the offset voltage $V_{os}$ is computed using equation (6) then the initial value of $C_f$ is calculated using equation (4) as indicated by block 48.

After the initial value of $C_f$ is determined, the calculations are reversed to determine a bridge offset voltage $V_{br}$ required to produce a desired value for $C_f$. As previously described, the desired value for $C_f$ is a value which gives the mass air flow sensor a response time within the specified range as indicated by block 50. The process then proceeds to inquire decision blocks 52 and 54, respectively, if the measured bridge offset voltage $V_{br}$ is equal to or greater than the required bridge offset voltage ($V_{br}$REQ). If the measured bridge offset voltage $V_{br}$ is equal to the required bridge offset voltage $V_{br}$, the process ends, otherwise if the measured bridge offset voltage $V_{br}$ is greater than the required bridge offset voltage $V_{br}$REQ, resistor R7 is laser trimmed as indicated by block 54 to increase its resistance value which, in turn, lowers the value of the bridge $V_{br}$. The bridge offset voltage $V_{br}$ is continuously monitored and compared with the required bridge offset voltage, decision block 52, until the laser trimming of R7 reduces the measured bridge offset voltage $V_{br}$ to be equal to the required bridge offset voltage.

Returning to decision block 54, when the measured bridge offset voltage $V_{br}$ is less than the required bridge offset voltage ($V_{br}$REQ), the resistor R6 is laser trimmed, as indicated by block 58, until the measured bridge offset voltage $V_{br}$ is equal to the required bridge offset voltage ($V_{br}$REQ). When the measured bridge offset voltage $V_{br}$ is equal to the required bridge offset voltage, ($V_{br}$REQ) decision block 52, the calibration of the response time of the mass air flow sensor is completed.

The calculation of the response time of the mass air flow sensor may be completely automated having a microprocessor performing the required calculation and decision operations set forth in the flow diagram, as well as controlling the operation of the laser trimming resistor R6 or R7.

Having disclosed a method for calibrating the response time of a mass air flow sensor with requiring an air flow, it is recognized that those skilled in the art may make changes or improvements to the disclosed method within the scope of the appended claims.

What is claimed is:

1. A method for calibrating the response time of a mass air flow sensor having a heated resistor, a cold resistor and a balanced bridge circuit having a bridge offset voltage $V_{br}$, a reference voltage $V_{REF}$ and a first and second biasing resistor connected to said reference voltage affecting the value of said bridge offset voltage, said method comprising the steps of:

measuring a value of said bridge offset voltage;

calculating a value of a constant $C_I$ of the heated resistor related to the response time of the balanced bridge circuit from said value of said bridge offset voltage;

calculating a value of a required bridge offset voltage necessary to generate a desired value of said constant $C_I$ which would produce a response time for said mass air flow sensor within specified limits;

comparing said value of said bridge offset voltage to said value of said required bridge offset voltage to determine which of said bridge offset voltage and said required bridge offset voltage has the greater value;

laser trimming said first biasing resistor to decrease said value of said bridge offset voltage to said value of said required bridge offset voltage in response to said bridge offset voltage having a value greater than said required bridge offset voltage; and laser trimming said second biasing resistor to increase said value of said bridge offset voltage to said value of said required bridge offset voltage in response to said required bridge offset voltage having a value greater than said bridge offset voltage.

2. The method of claim 1 wherein said bridge circuit generates a first voltage $V_1$ indicative of a current through said heated resistor and a second voltage $V_2$ indicative of a current through said cold resistor, said step of measuring said value of said bridge offset voltage comprises the steps of:

measuring the value of said first voltage $V_1$;

measuring the value of said second voltage $V_2$; and computing said value of said bridge offset voltage as the difference in the values of $V_1$ and $V_2$.

3. The method of claim 2 wherein said balanced bridge circuit has circuit components and an operational amplifier controlling the current through said heated resistor and said cold resistor in response to an offset voltage $V_{os}$ applied between a positive and a negative input to said operational amplifier, said step of calculating said value of said constant $C_I$ comprises the steps of:

calculating said value of said offset voltage $V_{os}$ from the value of said bridge offset voltage $V_{br}$; and calculating said value of said constant $C_I$ from the values of said circuit components and said value of said offset voltage $V_{os}$.

4. The method of claim 3 wherein said circuit components comprise a first resistor R1 connected between said heated resistor RH and a ground potential, a second resistor R2 connected in series with a third resistor R3 between said cold resistor RC and said ground potential, a fourth resistor R4 connected between a junction of said heated resistor and said first resistor R1 and said positive input to said operational amplifier and a fifth resistor R5 connecting a junction between resistors R2 and R3 to said negative input of said operational amplifier, said step calculating said value of said constant $C_I$ comprises solving a first equation:

$$C_I = \frac{RC+R3}{R5} C_2 \left[ \frac{R5+R7}{R7} \left( V_{REF} \left( \frac{R4}{R4+R6} - \frac{R5}{R5+R7} \right) - V_{os} \right) + \frac{V_{REF}}{C_1+1} C_1 \left( \frac{R6(R5+R7)}{R7(R4+R6)} - \frac{R5}{C_2(RC+R3)} \right) - \frac{V_{REF}R5}{C_2(R5+R7)} \right) \right]$$

where

R6 is the value of said first bridge biasing resistor,

R7 is the value of said second bridge biasing resistor, $$C_1 = \frac{R1}{R4+R7}$$

and $$C_2 = \frac{R5}{R2} + \frac{R5}{RC+R3} + \frac{R5}{R5+R7}.$$

5. The method of claim 4 wherein said step of calculating an initial value of said offset voltage $V_{os}$ comprises solving a second equation:

$$V_{os} = V_{REF} \left( \frac{R4}{R4+R7} - \frac{R5}{R5+R6} \right) + V_1 \left( \frac{R7}{R4+R7} \right) - V_2 \left( \frac{R6}{R5+R6} \right).$$

6. The method of claim 5 wherein said second equation may be rewritten as a third equation:

$$V_{br} = \left( \frac{R7+R5}{R7} \right) \left[ V_{os} - V_{REF} \left( \frac{R4}{R4+R6} - \frac{R5}{R5+R7} \right) - V_1 \left( \frac{R6}{R4+R6} - \frac{R7}{R5+R7} \right) \right],$$

said step of calculating a bridge offset voltage required to generate a desired value for said constant $C_I$ comprises the steps of:

solving said first equation with said constant $C_I$ having said desired value to generate a required value for said offset voltage $V_{os}$; and solving said third equation for said required value of said bridge offset voltage $V_{br}$ with said required value for said offset voltage $V_{os}$.

7. The method of claim 5 wherein said step of laser trimming said first biasing resistor comprises the steps of:

laser trimming said first biasing resistor when said value of said bridge offset voltage is greater than said value of said required bridge offset voltage to decrease said bridge offset voltage;

comparing the value of said bridge offset voltage to said required bridge offset voltage to determine when said value of said bridge offset voltage is equal to said required bridge offset voltage; and terminating said laser trimming of said first biasing resistor when said bridge offset voltage is equal to said required bridge offset voltage.

8. The method of claim 7 wherein said step of laser trimming said second bridge biasing resistor comprises the steps of:

laser trimming said second biasing resistor when said value of said bridge offset voltage is less than said value of said required bridge offset voltage to increase said value of said bridge offset voltage;

comparing said value of said bridge offset voltage to said required bridge offset voltage to determine when said value of said bridge offset voltage is equal to said required bridge offset voltage; and terminating said laser trimming of said second biasing resistor when said value of said bridge offset voltage is equal to said value of said required bridge offset voltage.

9. A method for calibrating the response time of a mass air flow sensor having a heated resistor, a cold resistor and a balanced bridge circuit, said balanced bridge circuit comprising an operational amplifier having a positive input, a negative input and an output connected to said heated resistor and said cold resistor, said circuit further having a first biasing resistor connecting the positive input of said operational amplifier to a reference voltage and a second biasing resistor connecting said negative input of said operational amplifier to said reference voltage, the resistance values of said first and second biasing resistors controlling a bridge offset voltage generated by the current flow through the heated resistor and the cold resistor, said method comprising the steps of:

applying electrical power to said mass air flow sensor;

measuring an initial value of said bridge offset voltage;

calculating an initial value of a constant $C_I$ of the resistance of said heated resistor from said value of said bridge offset voltage where said heated resistor has a value $RH = C + (1/I_H) C_I$, and where:

C is a constant equal to the approximated heated resistance value of said heated resistor controlled by said balanced bridge circuit, $C_I$ is a small constant controlling the response time of the mass air flow sensor, and $I_H$ is the current through the heated resistor, calculating a required value for said bridge offset voltage required to generate a predetermined value of said constant $C_I$, said predetermined value of said constant $C_I$ selected to give said mass air flow sensor a desired response time;

comparing said required value for said bridge offset voltage with said value of said bridge offset voltage to determine which has the greater value;

laser trimming said first biasing resistor to decrease said value of said bridge offset voltage to be equal to said required value in response to said bridge offset voltage having a value greater than said required value; and laser trimming said second biasing resistor to increase said value of said bridge offset voltage to be equal to said required value in response to said required value of said bridge offset voltage being greater than said value of said bridge offset voltage.

10. The method of claim 9 wherein said step of measuring a value of said bridge offset voltage comprises the steps of:

measuring a first voltage $V_1$ indicative of the current through said heated resistor;

measuring a second voltage $V_2$ indicative of the current through said cold resistor;

calculating said bridge offset voltage $V_{br}$ having a value:

$$V_{br} = V_1 - V_2.$$

11. The method of claim 10 wherein said step of calculating a value of said constant $C_I$ comprises the steps of:

calculating a value of an offset voltage $V_{os}$ between said positive and negative inputs of the operational amplifier from said bridge offset voltage; and solving an equation in which the value of said constant $C_I$ is a function of said value of said offset voltage $V_{os}$ to determine said value for the constant $C_I$.

12. The method of claim 11 wherein said step of calculating a required value of said bridge offset voltage comprises the steps of:

solving said equation with said constant $C_I$ having a desired value to generate a required value of said offset voltage $V_{os}$; and calculating said desired value of said bridge offset voltage from said desired value of said offset voltage.

* * * * *